Jan. 15, 1957 E. PFARRWALLER 2,777,472
SHUTTLE PICKING MECHANISM
Filed Oct. 29, 1953 2 Sheets-Sheet 1

INVENTOR.
ERWIN PFARRWALLER.
BY
ATTORNEY.

Jan. 15, 1957 E. PFARRWALLER 2,777,472
SHUTTLE PICKING MECHANISM
Filed Oct. 29, 1953 2 Sheets-Sheet 2
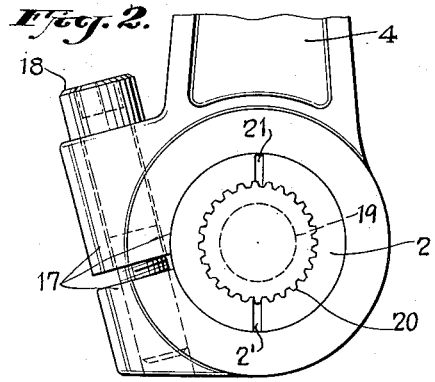
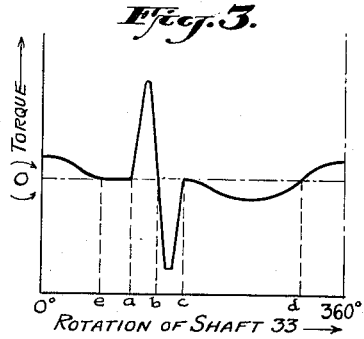
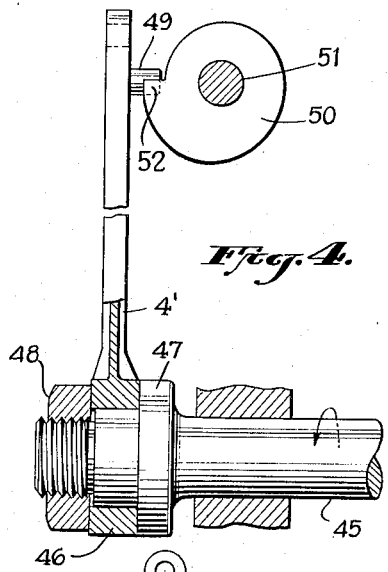
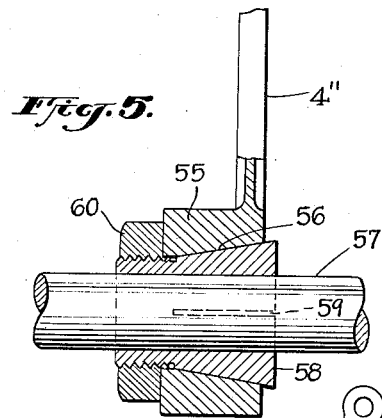
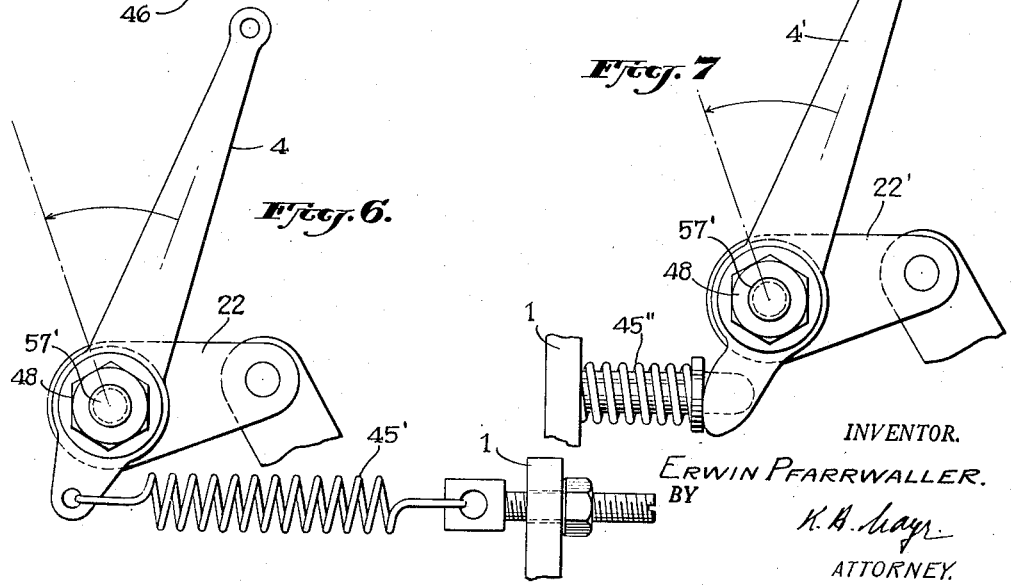
INVENTOR.
ERWIN PFARRWALLER.
BY
ATTORNEY.

United States Patent Office 2,777,472
Patented Jan. 15, 1957

2,777,472
SHUTTLE PICKING MECHANISM

Erwin Pfarrwaller, Winterthur, Switzerland, assignor to Sulzer Freres, S. A., Winterthur, Switzerland, a corporation of Switzerland Application October 29, 1953, Serial No. 388,957

Claims priority, application Switzerland November 3, 1952

8 Claims. (Cl. 139—145)

The present invention relates to a shuttle picking mechanism for looms for weaving, including a picking lever, which is removably connected with a power accumulator and which drives the shuttle by accumulated power after release of a locking device.

It is an object of the present invention to provide a shuttle picking mechanism, including a shuttle picking lever which is clamped to a shaft which is actuated by power accumulated in and released from a power accumulator, the torque produced by the released power being transmitted by adhesion.

It is conventional in weaving machines having gripper shuttles to provide a picking lever and a torsion rod spring having a square end inserted in a square hole in the hub of the picking lever for actuating the latter. Such a connecton is highly stressed due to the great acceleration forces when the shuttle is picked and because of the great retardation forces when the device is braked to a standstill. In addition, the direction in which these forces act changes several times during each operating period. A connection comprising a square or a key is gradually worn out so that the relative position of the picking lever and the shuttle is changed. If the picking lever is too far outwards from the picking position of the shuttle when the device is tensioned, there is a clearance between the picking pin and the shuttle causing knocking and noise. If the picking lever, after the device has been tensioned, is too close to the shed, lifting of the shuttle into the picking position is made difficult and the shuttle and the picking pin may be damaged. A worn-out connection cannot be repaired but must be replaced. Both parts of the connection must be renewed.

Clamp connections are known per se. They have not been used for transmitting the considerable and sudden forces occurring in shuttle picking mechanisms because it was believed that the relative position of the parts interconnected by clamping would soon be changed and require frequent readjustment, necessitating stoppage of the loom. This belief has been found erroneous and the advantage of the clamping connection residing in the fact that it cannot be worn can be fully utilized. Even if there is a little relative displacement of the parts which are connected by clamping, this displacement always tends to move the picking lever outwards from the picking position of the shuttle so that the aforedescribed damage to the shuttle and the picking pin cannot occur. The undesired clearance can be easily and quickly removed by loosening the clamping connection, resetting of the parts, and tightening the connection, without replacing any parts.

The novel features which are considered characteristic of the invention are set forth with particularity in the appended claims. The invention itself however and additional objects and advantages thereof will best be understood from the following description of the embodiments thereof when read in connection with the accompanying drawing in which:

Fig. 2 is a large scale end view of the clamp connection shown in Fig. 1;

Fig. 3 is a diagram whose ordinates indicate the torque transmitted by a clamp connection according to the invention and whose abscissae indicate the extent of rotation of the control shaft of the shuttle picking device;

Fig. 4 is a part sectional side view of a modified clamping connection according to the invention;

Fig. 5 is a part sectional side view of another modification of the clamping connection according to the invention;

Fig. 6 is a diagrammatic side view of a modified power accumulator arrangement;

Fig. 7 is a diagrammatic side view of a modification of the arrangement according to Fig. 6.

The same numerals designate the same parts in all figures.

Figure 1:
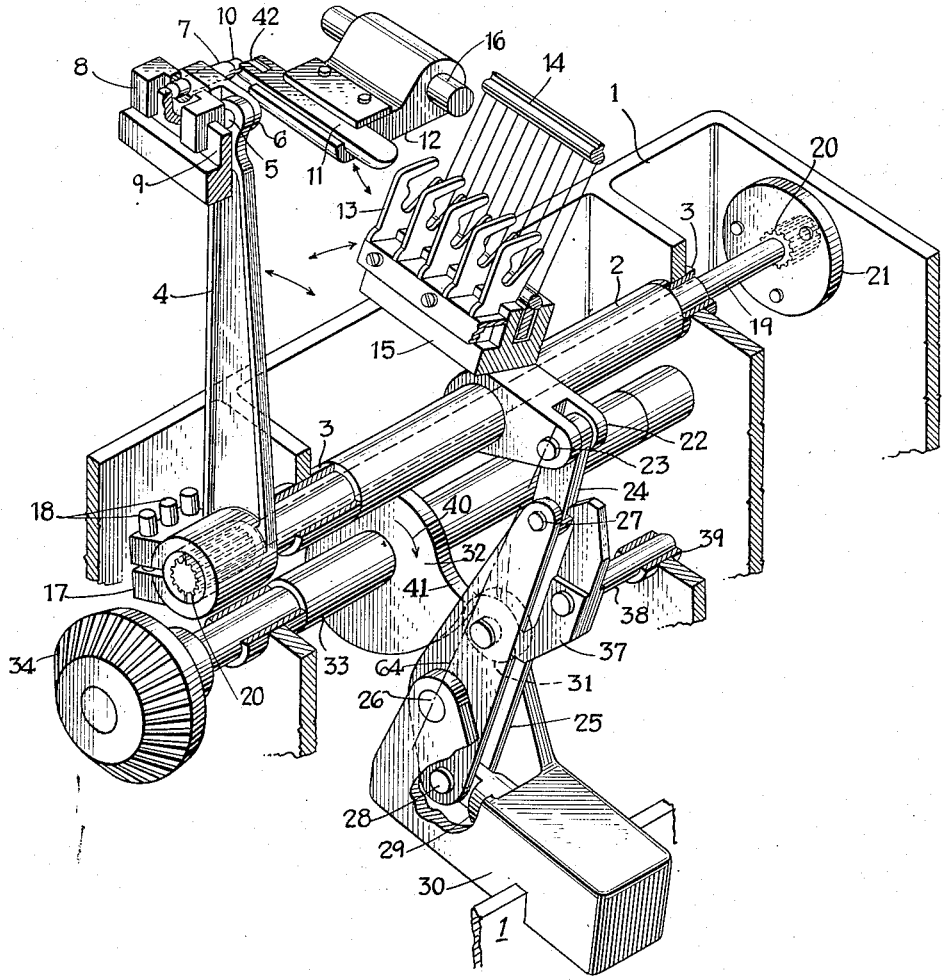
Fig. 1 is a perspective part sectional view of a portion of a shuttle picking mechanism including a clamp connection according to the invention between the shuttle picking lever and its drive shaft.

Referring more particularly to the drawing, a hollow shaft 2 is supported in bearings 3 in a casing 1 for the shuttle picking mechanism which casing is connected with the frame of the weaving machine, not shown. The hollow shaft 2 carries the picking lever 4 whose free end is connected by a pin 5 with a guide 6 encompassing a picking pin 7 which is arranged on a slide 8. The latter slides on a rail 9 which is fast on the casing 1. The head 10 of the pin 7 abuts against the rear end of a shuttle 11 which is in a shuttle lifter 12 and in picking position. The picking path is formed by elements 13 which are supported by the lay 15, as is the reed 14. Support and operation of the lay are not shown because this does not form part of the present invention.

The lower end of the picking lever 4 is provided with a sleeve 17 which is split on one side and serves for releasably connecting the lever 4 with the shaft 2. Screws 18 are provided for this purpose. The end of the hollow shaft 2 to which the picking lever is clamped has longitudinal slots 2' (Fig. 2). A torsion rod spring 19 axially extends through the hollow shaft 2 and is knurled at both ends. The knurls at the left end of the rod 19 engage the gaps between corresponding knurls in the interior of the shaft 2. The knurls at the right end of the rod 19 engage the gaps between corresponding knurls in a flange 21 which is fast on casing 1. An arm 22 is connected with the middle part of the shaft 2 which is pivoted by a pin 23 to a link 24 of a locking linkage including a two-arm lever 25 which swings on a pin 26 supported by the housing 1. The upper arm of the lever 25 is pivoted to the link 24 by a pin 27, the lower arm being pivoted by a pin 28 to a brake piston 29. The two-arm lever 25 carries a roller 31 which follows a cam 32 mounted on a shaft 33. The latter is actuated in the conventional manner by the loom drive shaft, not shown, which is connected by a clutch with the loom motor, so that the shaft 33 makes one revolution per pick. The parts of the loom which are not essential to the present invention are not illustrated. The linkage 24, 25 is held in locking position by a locking lever 37 which is fast on a shaft 38. The latter rotates in a bearing 39 mounted in the casing 1 and is actuated by a control mechanism, not shown, for releasing the picking mechanism for picking the shuttle 11.

The device operates as follows:

Upon rotation of the cam 32 in the direction of arrow 40, the lever 25 is turned to the right and the arm 22 is pressed upwards until the linkage 24, 25 is moved to the illustrated locking position beyond the connecting line 64 of pin 23 and fulcrum 26. In this position both ends of the locking lever 37 rest on the linkage 24, 25.

Due to the upward movement of pin 23, the arm 22 and the shafts 2 have been rotated counterclockwise. The left end of the torsion rod 19 has been rotated at the same time. Since the right end of the rod 19 is fast on the stationary flange 21, not only the picking lever 4 has been moved into its left end position which is the picking position, but also the rod spring 19, which serves as a power accumulator has been tensioned.

As soon as the cam portion 41 of the cam 32 releases the roller 31, linkage 24, 25 can be released by rotating the shaft 38 and the locking lever 37 counterclockwise, the upper arm of lever 37 pushing the link 24 and the pin 27 to the left until the latter has been moved so far to the left of the connecting line 64 that the linkage 24, 25 collapses.

Upon release of the locking lever 37, the power accumulated in the spring 19 is liberated and the shaft 2 is quickly accelerated for clockwise rotation. The picking force is transferred from the shaft 2 through the clamping sleeve 17 to the picking lever 4. The pin 7 drives the shuttle 11 to the right through the shuttle guide elements 13 and the weft thread held by the shuttle clamp 42 is pulled through the shed. The movement of the lever 25 and therefore of the whole picking mechanism is braked by the brake piston 29 shortly before the picking lever 4 reaches its right end position.

The clamped part of the hollow shaft 2 may be provided with longitudinal slots which make the end of the shaft yieldable so that this part of the shaft is firmly pressed against the knurls 20.

Fig. 2 illustrates the clamp connection between the picking lever 4 and the shaft 2 on a larger scale. Clearance between the knurls 20 of the rod spring 19 and of the shaft 2 has no undesired effect on the correct position of the picking lever relatively to the shuttle 11, because this position is determined by the linkage 24, 25 and the locking lever 37.

The ordinates of the diagram Fig. 3 indicate the torque to be transmitted by the clamping connection according to the invention from the circumference of the shaft 2 to the bore of the hub 17 of the picking lever 4 during an operating period between two consecutive weft thread insertions. Before the pick and after tensioning of the rod spring 19 and while it is held in tensioned condition by the shaft 2 and the extended toggle joint 24, 25, only the knurling 20 between the end of the torsion rod spring and the hollow shaft 2 is loaded, the clamping connection of hub 17 being without load and not transmitting any torque. This is indicated by line $e-a$ of the diagram Fig. 3.

If, however, the toggle joint 24, 25 is bent to the left by the locking lever 37 for effecting picking a shuttle, the torsion spring is released and accelerates the shaft 2 through the knurling 20 and consequently the picking lever 4 through the clamping connection 17. The rotation or friction moment steeply rises thereby at point $a$ in Fig. 3 from zero to a maximum value and thereupon falls back to zero at point $b$. Thereupon the velocity of the picking lever 4 is quickly retarded by the brake 29, 30. This causes a retarding moment in the clamp 17 which is below the zero line in Fig. 3 and which becomes zero at point $c$ after passing through a peak between points $b$ and $c$. At point $c$ the picking lever 4 comes to rest and the torsion rod spring is without tension. Thereupon the picking lever is moved from its right end position to its left end position for the following pick. This is effected by the cam 32. The picking lever must be accelerated between points $c$ and $d$ and is retarded from point $d$ to point $e$, the maximal torque during this period being between the maxima between points $a$ and $c$. At point $e$ all parts are in the position needed for the pick.

Fig. 3 not only shows the sudden stressing by the great acceleration forces between points $a$ and $c$ but also the multiple changes of the direction of these forces during the pick, which can produce a clearance due to knocking, if conventional key connections are used.

In the modification shown in Fig. 4, the torsion rod 45 serves as shaft for the picking lever 4' whose lower end is provided with an eye 46 which is pressed by a nut 18 against a collar 47 on the rod 45 so that the picking force of the spring 45 is transmitted by the friction between the collar or flange 47 and the eye 46 of the lever 4'. The latter is provided with a protuberance 49 resting on a locking element 50 which is fast on a shaft 51. The latter is rotated counterclockwise, as is the shaft 38 in Fig. 1, by a control mechanism, not shown, for initiating the picking operation. As soon as the nose 52 leaves the protuberance 49, the picking lever 4' is actuated by the spring 45.

Fig. 5 illustrates a further modification of a clamping connection according to the invention. The lower end of the picking lever 4" is provided with a sleeve 55 having a conical bore 56. A clamping element 58 which has a conical outer surface and an axial slot 59 is mounted on shaft 57. The sleeve 55 is pushed onto the element 58 and pressed to the right by means of a nut 60 screwed on a threaded end of the element 58. Due to the conical bore 56 the element 58 is compressed and clamped to the shaft 57 as well as to the sleeve 55, the resulting friction transmitting the picking force from the shaft 57 to the picking lever 4". The shaft 57 may be similarly supported as the shaft 2 in Fig. 1.

Instead of using a torsion rod spring as a power accumulator, a tension coil spring 45' may be provided, as shown in Fig. 6. One end of the spring 45' is connected with an arm fast on shaft 57', the other end being connected with the casing 1. For tensioning spring 45' a cam drive may be provided as in Fig. 1.

The device shown in Fig. 6 may be modified according to Fig. 7 in which a compression spring 45" is used instead of the tension spring 45'.

What is claimed is:

1. A shuttle picking mechanism for weaving machines comprising a shuttle picking lever having a hub having an annular surface portion, a shaft means for said lever, a power accumulator connected with said shaft means for rotating the latter, said shaft means having an annular surface portion corresponding to and being fully, frictionally engaged by the annular surface portion of said hub, and means for pressing said annular surface portions against each other.

2. A shuttle picking mechanism for weaving machines comprising a shuttle picking lever, shaft means for said lever, a power accumulator connected with said shaft means for rotating the latter, said picking lever having a radially split hub portion, bolts extending through said hub portion for clamping the latter to said shaft means, the torque produced by the power released from said accumulator being transmitted from said shaft means to said lever by adhesion of said hub portion to said shaft.

3. A shuttle picking mechanism for weaving machines comprising a shuttle picking lever having a hub portion, a shaft for said lever, a power accumulator connected with said shaft for rotating the latter; said shaft having a threaded end portion, a collar, and a cylindrical portion interposed between said threaded end portion and said collar; said hub portion being fitted on said cylindrical portion, and a nut screwed on said threaded end portion for pressing said hub portion against said collar.

4. A shuttle picking mechanism for weaving machines comprising a shuttle picking lever having a hub portion, a shaft for said lever, a power accumulator connected with said shaft for rotating the latter, a sleeve fixed to said shaft and having a threaded end portion and a longitudinally slotted conical portion flaring from said threaded end portion, said hub portion having a conical bore fitted on said conical portion, and a nut screwed on said threaded end portion and pressing said hub portion against said conical portion.

5. A shuttle picking mechanism according to claim 1, in which said power accumulator is formed by a torsion spring disposed coaxially of said shaft means.

6. A shuttle picking mechanism according to claim 1, comprising a casing and an arm mounted at an angle on said shaft means, said power accumulator consisting of a coil spring having one end connected with said casing and the other end connected with said arm.

7. A shuttle picking mechanism according to claim 1, said shaft means including a hollow shaft, said accumulator consisting of a torsion rod spring disposed inside said shaft, said picking lever being clamped to said hollow shaft, said rod spring having a knurled outside surface portion, the part of said hollow shaft to which said picking lever is clamped having a knurled interior surface engaging the knurled surface portion of said rod spring, the shuttle picking mechanism comprising an arm fast on said hollow shaft, a tensioning and brake lever linked to said arm, means for tensioning said rod spring, and means for braking the movement of said picking lever at the end of its shuttle picking stroke, both said means being connected with said tensioning and brake lever.

8. A shuttle picking mechanism according to claim 7 in which the part of said hollow shaft to which said picking lever is clamped is longitudinally slotted.

References Cited in the file of this patent

UNITED STATES PATENTS

| | | |
|---|---|---|
| 332,400 | Kesselring | Dec. 15, 1885 |
| 1,175,772 | Kelley | Mar. 14, 1916 |
| 2,160,338 | Moessinger | May 30, 1939 |
| 2,160,339 | Moessinger | May 30, 1939 |
| 2,421,599 | Cash | June 3, 1947 |
| 2,564,383 | Trautvetter | Aug. 14, 1951 |
| 2,615,474 | Ibanez | Oct. 28, 1952 |

FOREIGN PATENTS

| | | |
|---|---|---|
| 678,468 | Germany | July 15, 1939 |